United States Patent
Heldal

(10) Patent No.: US 10,220,354 B2
(45) Date of Patent: Mar. 5, 2019

(54) ELECTROOSMOTIC MEMBRANE

(71) Applicant: OSMOTEX AG, Alpnach Dorf (CH)

(72) Inventor: Trond Heldal, Lucerne (CH)

(73) Assignee: Osmotex AG, Alpnach Dorf (CH)

( * ) Notice: Subject to any disclaimer, the term of this patent is extended or adjusted under 35 U.S.C. 154(b) by 198 days.

(21) Appl. No.: 15/310,327

(22) PCT Filed: May 13, 2015

(86) PCT No.: PCT/EP2015/060698
§ 371 (c)(1),
(2) Date: Nov. 10, 2016

(87) PCT Pub. No.: WO2015/173359
PCT Pub. Date: Nov. 19, 2015

(65) Prior Publication Data
US 2017/0232404 A1    Aug. 17, 2017

(30) Foreign Application Priority Data
May 13, 2014 (GB) .................................. 1408472.7

(51) Int. Cl.
*B01D 61/00* (2006.01)
*B01D 71/48* (2006.01)
(Continued)

(52) U.S. Cl.
CPC ........... *B01D 71/48* (2013.01); *B01D 61/427* (2013.01); *B01D 61/56* (2013.01); *B01D 69/02* (2013.01);
(Continued)

(58) Field of Classification Search
CPC ........ A61N 1/30; A61N 1/303; A61M 5/172; B01D 63/005; B01D 63/088; B01D 61/56;
(Continued)

(56) References Cited

U.S. PATENT DOCUMENTS 3,227,662 A    1/1966 Kollsman
5,938,822 A    8/1999 Chen et al.
(Continued)

FOREIGN PATENT DOCUMENTS

CN    102101018 A    6/2011
JP    2006-297338 A    11/2006
(Continued)

OTHER PUBLICATIONS

Daiguji, Hirofumi et al., "Nanofluidic Diode and Bipolar Transistor", Nano Letters (2005), vol. 5, No. 11, pp. 2274-2280.
(Continued)

*Primary Examiner* — Alexander S Noguerola
(74) *Attorney, Agent, or Firm* — Fay Sharpe LLP

(57) ABSTRACT

A porous membrane for use in an electroosmotic pump for pumping a fluid by electroosmotic transport, the porous membrane comprising: first and second opposite surfaces and a net fluid flow direction extending in the porous membrane between said opposite surfaces, wherein when a given amount of charge flows through the porous membrane from the first to the second opposite surface more electroosmotic transport of the fluid will occur than when the same amount of charge flows through the porous membrane from the second to the first, opposite surface.

18 Claims, 3 Drawing Sheets

Figure 4:
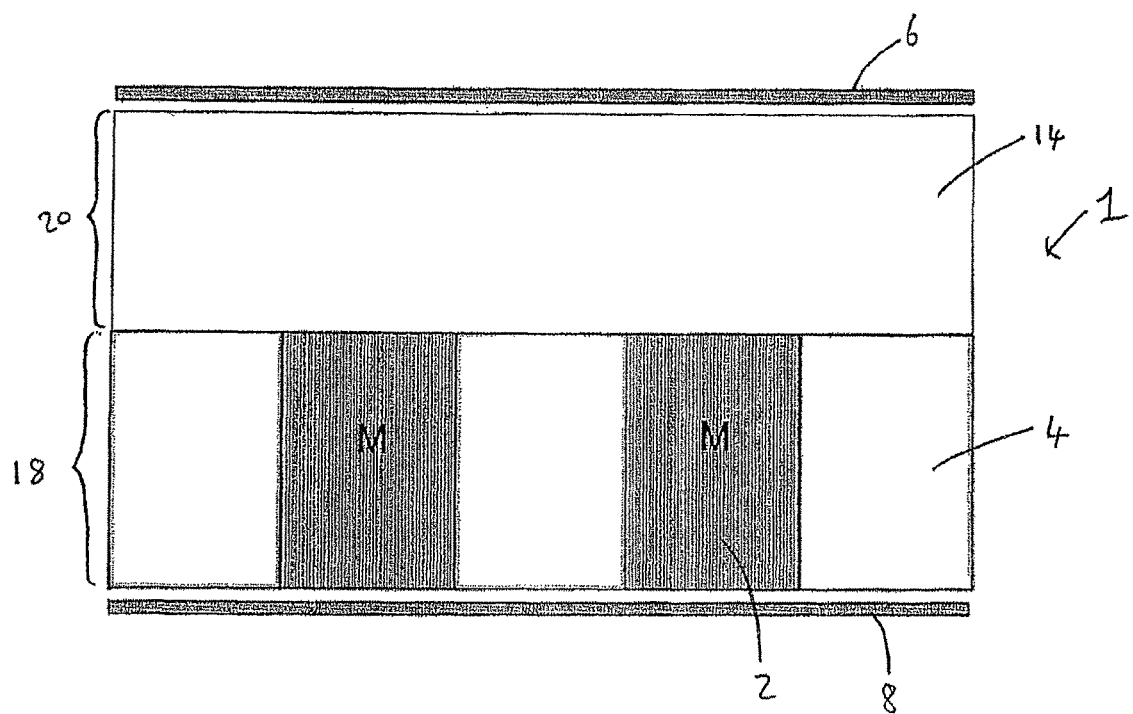

(51) Int. Cl.
  *B01D 61/56* (2006.01)
  *B01D 61/42* (2006.01)
  *B01D 69/02* (2006.01)
  *B01D 69/12* (2006.01)
  *F04B 19/00* (2006.01)
  *F04B 43/04* (2006.01)
  *F04B 43/00* (2006.01)
  *B01D 63/08* (2006.01)
  *B01D 63/00* (2006.01)
  *B32B 15/08* (2006.01)

(52) U.S. Cl.
  CPC ............ *B01D 69/12* (2013.01); *F04B 19/006* (2013.01); *F04B 43/0054* (2013.01); *F04B 43/043* (2013.01); *B01D 63/005* (2013.01); *B01D 63/088* (2013.01); *B01D 2325/02* (2013.01); *B01D 2325/14* (2013.01); *B01D 2325/26* (2013.01); *B01D 2325/42* (2013.01); *B32B 15/08* (2013.01)

(58) Field of Classification Search
  CPC ....... B01D 61/427; F04B 19/006; B32B 7/00; B32B 7/02; B32B 15/00; B32B 15/08–15/098
  See application file for complete search history.

(56) References Cited

U.S. PATENT DOCUMENTS

| | | | |
|---|---|---|---|
| 6,409,698 B1 * | 6/2002 | Robinson | A61M 5/14276 204/550 |
| 2006/0108286 A1 | 5/2006 | Hambitzer et al. | |
| 2006/0275138 A1 | 12/2006 | Sheng et al. | |
| 2009/0281528 A1 | 11/2009 | Grovender et al. | |
| 2010/0294652 A1 | 11/2010 | Sugioka | |
| 2011/0097215 A1 * | 4/2011 | O'Shaughnessy | B01D 61/427 417/48 |
| 2012/0285881 A1 | 11/2012 | Jikihara et al. | |

FOREIGN PATENT DOCUMENTS

| WO | WO 2004/007045 A1 | 1/2004 |
|---|---|---|
| WO | WO 2006/128039 A2 | 11/2006 |
| WO | WO 2009/098486 A1 | 8/2009 |
| WO | WO 2010/097581 A2 | 9/2010 |
| WO | WO 2012/022984 A1 | 2/2012 |

OTHER PUBLICATIONS

Karnik, Rohit et al., "Rectification of Ionic Current in a Nanofluidic Diode", Nano Letters (2007), vol. 7, No. 3, pp. 547-551.

Vlassiouk, Ivan et al., "Nanofluidic Diode", Nano Letters (2007), vol. 7, No. 3, pp. 551-556.

Woermann, D., "Electrochemical Transport Properties of a Cone-Shaped Nanopore: Revisited", Phys. Chem. Chem. Phys., (2004), 6, pp. 3130-3132.

International Search Report and Written Opinion of International Application No. PCT/EP2015/060698 dated Nov. 5, 2015, 20 pages.

UKIPO Search Report of GB 1408472.7 dated Nov. 28, 2014, 4 pages.

UKIPO Search Report of GB 1408472.7 dated Jul. 15, 2015, 4 pages.

* cited by examiner

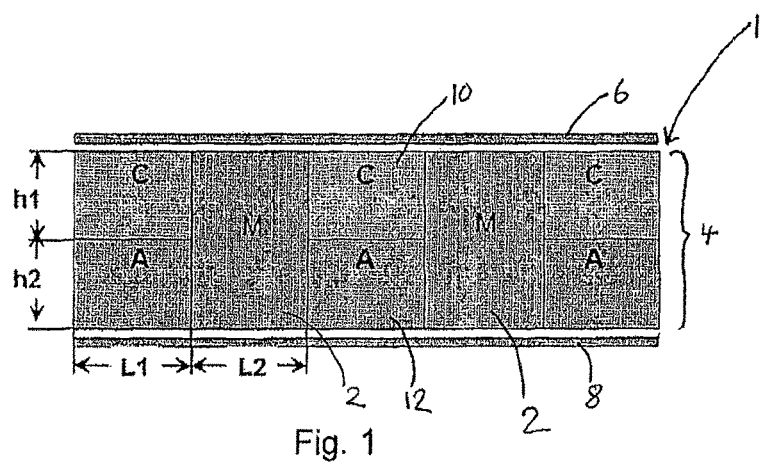
Fig. 1
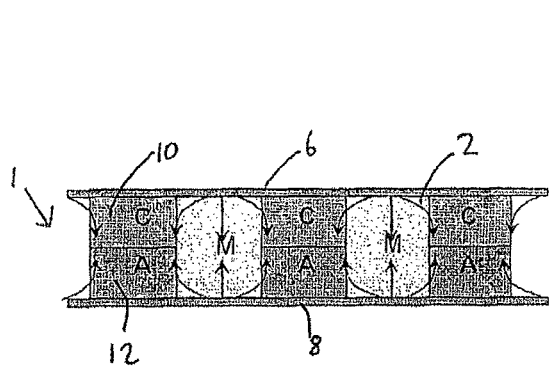
Fig. 2a
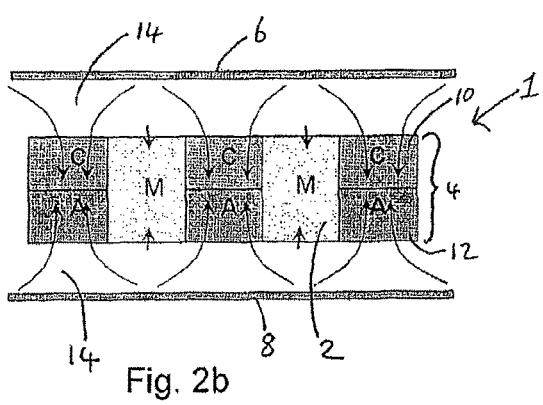
Fig. 2b
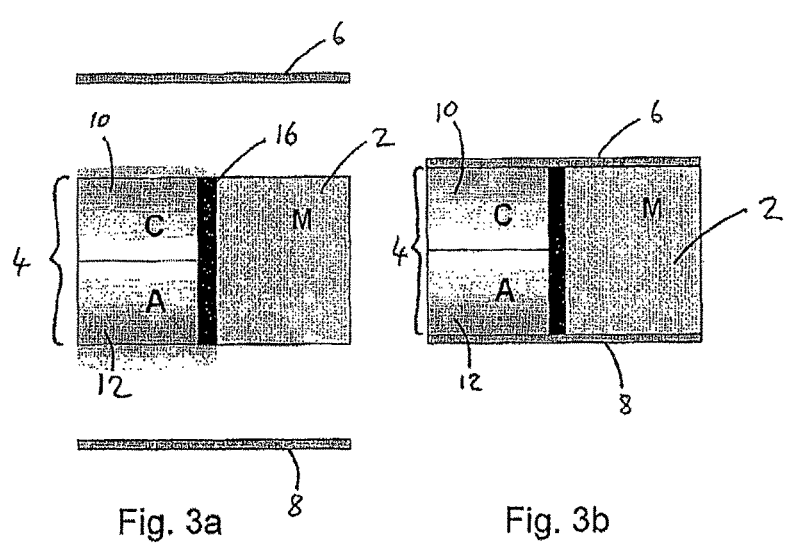
Fig. 3a
Fig. 3b

ELECTROOSMOTIC MEMBRANE

BACKGROUND

The invention relates to a porous membrane for pumping a fluid by electroosmotic transport, an electroosmotic pump, a textile comprising a porous membrane for pumping a fluid by electroosmotic transport and a method of using a porous membrane to pump a fluid by means of electroosmosis.

Recent applications of electroosmotic liquid transport include small pumps for microfluidic applications as well as membranes for fast moisture transport in textiles for various uses. The electroosmotic actuation principle has many advantages such as including direct electronic control of liquid flow, the ability to obtain moisture transport in very small pores and the ability to generate pressures up to several bars. This technology is also very scalable—the same porous materials can be used for pumping nanoliters per minute in a drug delivery system or up to several liters per minute in a medical or industrial textile laminate, simply by scaling the surface area.

A challenge with this technology is, however, the presence of concomitant electrochemical reactions. An electroosmotic (EO) pump consists of a pore or porous materials placed between two electrodes, and, in use, an ionic current is transferred between the electrodes through the pores of the pump. Frequently, inert electrodes are used, depending on electrolysis of the liquid in order to sustain a direct current. However, this causes the typical challenges of gas bubble formation, pH change and electrochemical changes to the liquid being pumped.

Several methods have been devised to overcome those challenges. For example, a micropump has been designed where the electrodes were placed in chambers separated from the liquid flow by ion exchange membranes. Others have designed systems where the electrodes are separated from the pump by long capillaries, and placed in open reservoirs. Both of these known designs reduce pH change and other electrochemical changes near the pump, as well as moving gas bubble formation away from the flow path. However, this comes at an expense of complexity of design and the need for high voltages (typically tens to hundreds of volts), making them difficult to apply in many cases, including pumps.

It is known to use redox couple electrodes to avoid water electrolysis. This removes, or reduces, the challenge of bubble-formations, and in many cases also reduces pH changes (if H+ and OH— are not produced by the redox reactions, as it will be, for example, for the Ag—AgO redox couple but not for Ag—AgCl). This makes it possible to pump for a significant period of time in one direction (up to several hours with thin electrodes). By reversing the electrode polarities from time to time (i.e. operating the electrodes reversibly), the durability can be greatly extended, in principle to years of operation. Such modes of operation are disclosed, for example, in WO 2010/097581 and WO 2012/022984. However, normal EO pumps have a linear flow—current relation, and thus no net fluid flow is obtained by such a scheme of operating the electrodes reversibly.

Some nonlinear EO pumps have been devised. Such pumps could even be operated by using standard inert electrodes and high enough frequencies to suppress faradayic currents. By using an asymmetric AC signal, it is possible to obtain a net, but also very pulsative, flow, with the stronger pulse dictating the direction of transport. Such pumps have however the limitation of generating very small pressures, typically below one millibar. This is partly because the polarizable elements defining the porous structure have a certain minimum size (due to practical limitations of their manufacture), resulting in a relatively large pore size which again gives lower ED pumping pressures.

In simple pores with classical ED, directed pumping in AC fields are only observed as transients lasting typically several seconds, after which only pumping back and forth is observed. Thus, no net fluid flow is observed.

As standard EO pumps with a fixed surface charge allow for less specific pore geometries and very small pore size, they can provide superior performance. However, since fluid flow is a linear function of electric current, it is not possible to obtain an average net fluid flow when passing the same amount of charge in each direction as described above (i.e. when operating the electrodes reversibly).

BRIEF SUMMARY

In its broadest aspect, the present invention provides a porous membrane for pumping a fluid by electroosmotic transport, the porous membrane comprising: first and second opposite surfaces and a net fluid flow direction extending in the porous membrane between said opposite surfaces, wherein when a given amount of charge flows through the porous membrane from the first to the second opposite surface more electroosmotic transport of the fluid will occur than when the same amount of charge flows through the porous membrane from the second to the first, opposite surface.

This overcomes the challenge of current electroosmotic pumps, by yielding a directed fluid flow when using reversible or polarizable electrodes even when passing the same amount of charge on average in both directions between them.

According to a first aspect, the present invention provides a porous membrane for pumping a fluid by electroosmotic transport, the porous membrane comprising: a (first) porous layer having first and second opposite surfaces and a net fluid flow direction extending in the porous layer between said opposite surfaces, the (first) porous layer having a first region extending in the net fluid flow direction, and a second region laterally offset from the first region with respect to the net flow direction and extending in the net fluid flow direction, wherein, when a given amount of charge flows through the porous membrane in a first direction, the ratio of the amount of charge flowing through the first region compared to the second region is greater than when the same amount of charge flows through the porous membrane in a second, opposite direction.

The first direction may be the net fluid flow direction.

Charge may flow in the first direction when a first voltage bias is applied across the membrane and may flow in the second, opposite direction when a second, opposite voltage bias is applied.

The porous membrane may behave such that the amount of charge in a given time which flows through the first region, when a first voltage bias is applied across the porous membrane, is higher than when a second, opposite voltage bias, which is equal in magnitude to the first voltage bias is applied across the porous membrane. This may not necessarily be how the porous membrane is operated in use (the opposite voltages may have different and/or varying magnitudes and be applied for different and/or or varying durations) but rather defines a condition of how the membrane will behave when certain voltages are applied across the membrane.

The impedance of the second region may be such that the resistance of the second region to ionic current depends strongly on the instantaneous voltage across it, as specified by its bias (direction/polarity) and magnitude, and more strongly than is the case for the first region. As a result, when an electric signal with selected absolute value and duration is applied as oppositely biased pulses to the porous membrane, it may result in a larger amount of charge passing through the second region per unit time (i.e. ionic current) in the second (e.g. forward) bias pulse of the second region compared to in the first (e.g. reverse) bias pulse of the second region.

The time of each pulse may be adjusted such that the sum of charge passed in the first direction equals, or is similar to, the amount passed in the second direction through the porous membrane. This may result in there being a net transfer of charge through the second region in its positive bias direction, and consequently a net directed transfer of charge through the first region in the direction of the negative bias for the second region, the two oppositely directed charge transfers optionally being equal in magnitude. This can result in a net EO transport through the first region, even when the EO transport is linear with respect to the current. The membrane may be operated such that there is zero, or near zero, net flow of charge over time. The zero, or near zero, net flow of charge over time makes it possible to use reversible electrodes for directed EO pumping, eliminating or reducing undesired electrolysis and gas bubble formation.

The magnitude of the voltage may be equal in the forward and reverse bias pulses, however, this is not necessarily the case.

In a second aspect, the present invention provides a method of pumping a fluid through a porous membrane, the method comprising: providing a porous membrane comprising: a (first) porous layer having first and second opposite surfaces and a net fluid flow direction extending in the porous membrane between said opposite surfaces, the (first) porous layer having a first region extending in the net fluid flow direction, and a second region laterally offset from the first region with respect to the net flow direction and extending in the net fluid flow direction; causing charge flow across the porous membrane in a first direction by applying a voltage bias across the membrane, and causing charge flow across the porous membrane in a second direction opposite to the first direction by applying an opposite voltage bias across the membrane, and wherein, when a given amount of charge flows through the porous membrane in a first direction, the ratio of the amount of charge flowing through the first region compared to the second region is greater than when the same amount of charge flows through the porous membrane in a second, opposite direction.

The method may be such that, in a given amount of time, there is no net flow of charge across the membrane. Alternatively, there may be small net flow of charge over time. The small net flow of charge may result from current flow difference of 10% or less, 5% or less, or 1% or less of the current during each positive or negative pulse. For example, there may be a current of 1 A per square meter during application of a voltage pulse and the difference in current between the positive and negative pulses may be 0.1 A.

The porous membrane may behave such that the amount of charge in a given time flowing through the first region, when a first voltage bias is applied, is higher than when a second, opposite voltage bias, which is equal in magnitude to the first voltage bias, is applied.

The porous membrane can be used to form an electroosmotic pump or it may be used in a textile which can give a net electroosmotic fluid flow even when zero net charge flows across the membrane. The pump or textile may be operated such that there is no, or a small, net charge flow. However, even in these cases it is still possible to obtain a significant net electroosmotic flow in one direction. For example, in a membrane with 10% porosity the amount of flow may be between 2 litre/$m^2$/hour and 100 litre/$m^2$/hour.

Such a pump or textile may also have a significant pumping pressure as one of the regions, such as the first region, may be a region for electroosmotic flow which can be designed to optimise electroosmotic transport, e.g. due to the pore size and surface chemistry.

By zero or no net charge flow it is meant that the same amount of charge is passed through the porous membrane (e.g. between electrodes which may be on opposite sides/surfaces of the porous membrane) in both directions when averaged over several pulses or reversals of the voltage bias, i.e. the electric field. In the case when the same amount of charge is passed between the electrodes over time, or there is only a small net charge flow, the challenges of bubble formation and liquid electrolysis can be solved, or at least minimised, whilst still using a linear EO pump with significant flow and pressure. In an electroosmotic pump, with such a porous membrane, the electrodes can be operated reversibly whilst still maintaining a net fluid flow.

In certain cases there may be a small net charge flow over time (e.g. when averaged over several pulses or reversals of the voltage bias)

The magnitude, duration and current of the opposite pulses applied across the membrane may be different. However, the signal may be controlled such that the net flow of charge over a given amount of time is zero, or near zero.

A system comprising the porous membrane may be operated in a potentiostatic or "charge counting" mode, with the voltage (magnitude or bias) or length of pulses being automatically adjusted to assure equal charge transfer in both directions.

In the present invention a net electroosmotic transport of fluid may be achieved in the net fluid flow direction even when the same amount of charge passes back and forth though the porous membrane, i.e. when there is no net flow of charge.

The membrane may comprise an additional, i.e. second, porous layer on one of the surfaces of the first porous layer.

The porous membrane may be arranged so that charge flows from the second porous layer into the first porous layer when the second voltage bias is applied.

The second porous layer may be provided on the upstream (in relation to the direction of net fluid flow) surface of the first porous layer.

The second region may have a lower resistance to the flow of charge compared to the first region when the second voltage bias is applied across the porous membrane.

The second porous layer may have a thickness which is substantially the same as, i.e. within 10% of, the width of the first region and/or the second region. The second porous layer may have a thickness which is greater than the width of the first region and/or the second region.

The second porous layer may have a larger average pore size than the average pore size of the first region of the first porous layer. For example, the average pore size of the second porous layer may be at least double the average pore size of the first region of the first porous layer. The second porous layers may effect substantially no electroosmotic transport, or less electroosmotic transport than the first region of the first porous layer, when a voltage is applied across the porous membrane. The second porous layer may have a low resistance to fluid flow so that the second porous layer does not affect flow of fluid through the first porous layer.

When electrodes are placed either side of the porous membrane the second porous layer may act as a spacer between one of the electrodes and the first porous layer. This may result in the ratio of the amount of charge flowing through the first region compared to the second region being greater, when a given amount of charge flows through the porous membrane in a first direction than when the same amount of charge flows through the porous membrane in the opposite direction. This may additionally or alternatively result, or aid, in the amount of charge in a given time which flows through the first region, when a first voltage bias is applied across the porous membrane, being higher than when a second, opposite voltage bias, which is equal in magnitude to the first voltage bias, is applied. This is because the second porous layer may provide a distance over which the electric field can deviate towards the second region (because the second region may be more conductive than the first region) when the second voltage bias is applied across the membrane. This means that a greater percentage of the charge can flow through the second region when a second voltage bias is applied so that less electroosmotic transport occurs in the direction opposite to the net fluid flow direction (as the second region may have inferior electroosmotic transport properties to the first region).

The porous membrane may comprise a third porous layer which is located on the surface of the first porous layer opposite to the second porous layer. The third porous layer may be thinner (in the direction of net fluid flow) than the second porous layer. The third porous layer may also have one or more of the optional features of the second porous layer.

In an embodiment, the second region may consist of an anion exchanger or a cation exchanger only. The ion exchanger can have the same charge sign as the surface of the first region. In the case that the second region consists of an anion exchanger or a cation exchanger only and the porous membrane comprises the second porous layer, the ionic current can deviate towards the ion exchanger (i.e. second region) when a bias is applied across the porous membrane in which cations or anions (depending on whether the ion exchanger is an anion or a cation exchanger) move through the additional second porous layer towards the ion (cation or anion) exchanger, but can deviate to a much lesser degree when an opposite voltage bias is applied across the porous membrane in which the ions travel from the side on which there is no additional porous layer or a thinner third porous layer, hence creating more EO transport with the later bias.

The second region may have a higher resistance to flow of charge when the first voltage bias is applied across the porous membrane than when the second opposite voltage bias, which is equal in magnitude to the first voltage bias, is applied across the porous membrane. This condition may only apply at certain voltage magnitudes. For example, there may be a threshold voltage magnitude above which the material of the second region operates under a limiting current condition. Under this condition, a change in voltage bias does not change the current, i.e. resistance. However, at a voltage magnitude below the threshold, the material could have a resistance which depends on the voltage bias.

In this case, it is not essential for the porous membrane to comprise an additional porous layer to result in the ratio of the amount of charge flowing through the first region compared to the second region being greater, when a given amount of charge flows through the porous membrane in a first direction than when the same amount of charge flows through the porous membrane in the opposite direction and/or to result in the amount of charge in a given time which flows through the first region, when the first voltage bias is applied across the porous membrane, being higher than when a second, opposite voltage bias, which is equal in magnitude to the first voltage bias, is applied. This is because the relative resistances of the first and second regions will vary depending on the polarity of the voltage applied across the membrane. Thus, this change in the relative resistances can result in a greater ratio of charge flow through the first region when the charge flows in a certain direction or more charge flowing through the first region when a first voltage bias is applied across the porous membrane compared to when an opposite and equal bias applied across the membrane.

The present invention provides a porous membrane in which, for a given amount of charge flowing through the membrane in one direction (from the first surface to the opposite second surface of the (first) porous layer, i.e. in the membrane thickness direction), more electroosmotic transport will be induced than when the same amount of charge flows through the porous membrane in the opposite direction. This has the advantage that the porous membrane can be used with an alternating current whilst still obtaining net electroosmotic flow.

As set out above, the ratio of the amount of charge flowing through the first region compared to the second region is greater, when a given amount of charge flows through the porous membrane in a first direction than when the same amount of charge flows through the porous membrane in the opposite direction. The first region may be for electroosmotic flow. This means that there can be net flow of fluid owing to the first region pumping more fluid by means of electroosmosis in one direction when charge flows in a first direction compared to the amount of fluid pumped by electroosmotic flow in the other direction when the charge flows in the second direction. Thus, there may be electroosmotic transport of a fluid in both directions, however, there will be more in one direction compared to the other, thus resulting in net electroosmotic transport of a fluid.

The amount of electroosmotic transport which occurs through the first region for a given amount of charge flowing through said region in a first direction may be the same as the amount of electroosmotic transport which occurs through the first region for the given amount of charge flowing through said region in a second, opposite direction, i.e. the electroosmotic transport properties of the first region may be symmetrical.

Further, the conductivity of the first region may be the same irrespective of the voltage bias across the porous membrane. Alternatively, the conductivity of the first region may depend on the voltage bias. In the case that the second region also has a conductivity which depends on the voltage bias, the asymmetry of the conductivity of the first region may be different from the asymmetry of the conductivity of the second region. This is so that it is possible for the amount of charge in a given time which flows through the first region, when the first voltage bias is applied, to be higher than when the second, opposite voltage bias is applied. The ratio of the amount of charge which flows through the first region compared to the second region in a given time may be different when a first voltage bias is applied, compared to when a second, opposite voltage of equal magnitude is applied.

The porous membrane may be arranged so that when a given amount of charge flows through the first region, more electroosmotic transport will occur than when the given amount of charge flows through the second region.

The first region may have a relatively high amount of electroosmotic transport for a given amount of charge (compared to the second region) and/or the second region may have a relatively low amount of electroosmotic transport for a given amount of charge (compared to the first region). In particular, the amount of electroosmotic transport for a given amount of charge through the first region in the direction of the net fluid flow may be higher than the amount of electroosmotic transport for a given amount of charge through the second region in the direction opposite to the direction of the net fluid flow. By amount of electroosmotic transport it is meant the amount (e.g. volume) of fluid which is pumped across the membrane due to electroosmosis.

The second region may cause no, or a negligible amount of, electroosmotic transport when charge flows across the second region.

The first region may comprise one or a plurality of pores. The second region may comprise one or a plurality of pores.

The pore(s) of the first region and/or the pore(s) of the second region may have a pore length which is normal, or approximately normal to the porous membrane surface plane, i.e. parallel, or approximately parallel to the net fluid flow direction.

The first region may have a larger average pore size than the average pore size of the second region. This applies even when one or both regions only have a single pore.

The first region may have a pore size greater than 20 nm, or greater than 50 nm. The first region may have a pore size less than 1 micron, or less than 400 nm, e.g. the pore size of the first region may be between 20 nm and 1 micron or between 50 nm and 400 nm.

The second region may have a pore size less than 50 nm, less than 20 nm or less than 5 nm. The desired pore size of the two regions will, however, depend on the fluid which the porous membrane is designed to pump.

By "pore size" or "average pore size" it is meant the pore size measured by the bubble point test.

The pore size, i.e. the width of the pores (which is the diameter in the case of pores with a circular cross section), of the membrane, one of the porous layers or a region may be determined using the well-known bubble-point test which is described in American Society for Testing and Materials Standard (ASMT) Method F316.

The (first) porous layer may comprise a plurality of first regions and a plurality of second regions. When there is a plurality of first regions and/or a plurality of second regions, the first and second regions may be laterally alternating along the length of the (first) porous layer.

The (first) porous layer may consist of only one or more first regions and one or more second regions.

The (first) porous layer may be formed from an interconnected structure of the first region in which a plurality of second regions are formed thereby creating a plurality of first regions and a plurality of second regions.

The first region may have a width, i.e. dimension in a direction parallel to the plane of the surface of the porous layer, which is substantially the same as the width of the second region, i.e. within 10% of the width of the second region.

The cross sectional area of the porous membrane which comprises the first region(s) may be substantially the same as the cross sectional area of the porous membrane which comprises the second regions i.e. within 10% of the cross sectional area of the second region. In this case approximately 50% (i.e. within 45 to 55%) of the cross sectional area of the porous membrane may be formed from the first region and approximately 50% (i.e. within 45 to 55%) of the cross sectional area of the porous membrane may be formed from the second region.

Alternatively, the porous membrane may comprise a greater percentage of first regions compared to second regions. For example, the cross sectional area of the porous membrane which comprises the first region(s) may be greater than 60%, greater than 70% or greater than 80%.

The porous layer may comprise only first and second regions, i.e. it may consist of first and second regions.

The width of the first region(s) may be between 10 and 100 microns and the width of the second region(s) may be between 10 and 100 microns. Alternatively, the regions may cover a much larger area and for example may each have an area which is 1 $mm^2$ or greater. The first region may be formed from a standard electroosmotic porous membrane. For example, the first region may have a pore size between 20 and 200 nm and/or have pore walls carrying a zeta potential with absolute value of between 10 and 100 mV and/or comprise sulfonic acid groups.

In an embodiment, the first region may be formed from a track etched substrate such as polycarbonate, or polyethylene terephthalate (PET), with cylindrical pores.

The pore(s) in the first region may have a constant pore size along their length, i.e. the pore width may have a variation of less than 5% along its length.

As discussed above, the second region may be formed from an ion exchange material and may consist of only one type of ion exchange material, i.e. either an anion exchange membrane or a cation exchange membrane.

Alternatively, the second region may be formed from one or more ionic diodes. In this case, the second region should have a higher ionic conductivity in one direction compared to the other, opposite direction.

Nanofluidic diodes which could be used to form the second region are disclosed in a number of papers such as "Rectification of Ionic Current in a Nanofluidic Diode", Rohit Karnik et al, Nano Letters 2007 Vol. 7, No. 3, 547-551, "Nanofluidic Diode and Bipolar Transistor", Hirofumi Daiguji et al, Nano Letters 2005 Vol. 5, No. 11, 2274-2280, and "Nanofluidic Diode" Ivan Vlassiouk et al, Nano Letters 2007 Vol. 7, No. 3, 551-556.

For example, the second region may comprise a bipolar ion exchange membrane which comprises a bilayer of cation and anion exchange membranes in a direction across the (first) porous layer from the first to the second opposite surface of the (first) porous layer. Thus, the second region may be a membrane that contains on a side towards the first surface of the (first) porous layer an anion exchange layer and on the other side towards the second surface of the (first) porous layer a cation exchange layer (or vice versa). The cation exchange membrane may be towards the upstream side of the porous membrane and the anion exchange membrane may be on the downstream side of the porous membrane if the pore walls of the first region carry a positive zeta potential, and vice versa if the pore walls of the first region carry a negative surface potential.

The pores in the second region may be in the structure of the material of the exchanger itself, e.g. if it is formed from a polymer the pores may be formed by the polymer structure, i.e. gaps between the polymer chains, rather than through pore formers or perforations in the material. Thus, the pores may have a very small pore width. These pores may be large enough for ions to flow but too small for the fluid being pumped through the porous membrane to flow through the second region. Thus the second region may provide a path for the flow of current but not for the flow of a fluid.

Example ion exchange materials which may be used in the second region include aminated (anion exchange) or sulfonated (cation exchange) polystyrene which is cross-linked with divinyl benzene. Another example is fluorinated polymers which carry sulfonic acid groups, like DuPont's Nafion® membrane. These example materials have a high charge density (by amine or sulfonic acid or carboxylic acid or other groups) which results in a high ionic conductivity. At the same time, due to their small pore size they show a very low amount of electroosmotic transport.

Alternatively, or additionally, the second region may comprise one or more pores which have a geometrical asymmetry along their length. The pore size of each pore may increase along its length, i.e. in a direction of the net fluid flow. For example, the pore(s) may be substantially conical pore(s) in which the diameter of the pore(s) changes, e.g. increases through the thickness of the (first) porous layer. The pores are termed substantially conical because they would be truncated cones as they have an opening at each end.

The asymmetric pores may be formed in a track etched membrane. The narrow end of the asymmetric pore may have a width less than 5 nm, for example, 2.5 nm.

The asymmetric geometry of the pore(s) can cause the pore(s) to have a resistance to the flow of charge which is higher when a first voltage bias is applied across the porous membrane comprising the asymmetric pore(s) than when a second, opposite voltage bias, which has an equal magnitude to the first voltage bias is applied across the porous membrane.

The asymmetric pores may have a constant surface charge along their length. However, the asymmetric conductivity can be increased by having a region towards one end of the pore with a negative surface charge and a region at the opposite end of the pore with a positive surface charge. In this sense, the pore(s) in the second region can have an asymmetric geometry and/or an asymmetric charge along its length (i.e. in a direction through the porous membrane in which the net fluid flow occurs).

The first voltage bias may be a reverse bias direction of the ionic diode and the second voltage bias may be a forward bias direction of the ionic diode.

In an embodiment, with a forward voltage bias, more charge will pass through the second region (the ionic diode) in a given time, due to its lower resistance to the flow of charge than with a reverse bias of equal magnitude to the forward bias. With the reverse bias a larger (comparative to the amount of charge which passes through the first region with the forward bias in a given amount of time) or even dominating part of the charge will pass through the first region, e.g. standard EO pores. This can result in higher levels of EO transport with a reverse bias compared to a forward bias even in the case when the same amount of electric charge is passed in both directions across the porous membrane, e.g. between electrodes.

The first region and the second region are laterally offset from each other with respect to the net fluid flow direction of the (first) porous layer and thus are provided in parallel to each other within the porous membrane with respect to the charge flow or net fluid flow direction.

The first region(s) and/or the second region(s) may extend entirely through the (first) porous layer from the first surface to the second opposite surface of the porous membrane.

The (first) porous layer may include an electrical insulator between the first region(s) and the second region(s). This means that current can be prevented from flowing (or the current flow may be minimised) from the first region to the second region laterally within the (first) porous layer and vice versa and thus can improve the efficiency of a pump using the porous membrane.

The material of the substrate of the (first) porous layer itself, e.g. polycarbonate or PET, may act as the insulator between the first and second regions. This may for example be when the (first) porous layer is provided by a track etched membrane formed from a material such as polycarbonate or PET.

The electric signal applied across the membrane to effect fluid flow may be AC or pulsed DC. It may be in the form of current pulses, for example symmetric square pulses.

The electrical signal applied across the porous membrane may be arranged to cause no, or only a small, net charge flow over time in order to operate the electrodes reversibly or near reversibly. In the case there is no net charge flow over time, the period of time over which no net charge is passed may be of the order of milliseconds, seconds, minutes, hours or even days or more depending on the electrical signal applied across the membrane.

The magnitude of the voltage in opposite pulses may be different. However, it may be that in this case, the length of time of the pulses may be controlled so that over a given period of time (which may be over a number of pulses) there is zero, or near zero, net charge transfer.

The duration of opposite pulses may also be different and/or vary.

In certain embodiments, different pulse lengths may be applied when the opposite voltage biases are equal in magnitude. Similarly, in certain cases the opposite voltages may not be equal in magnitude but applied for the same, or different and/or varying lengths of time.

The current between opposite pulses may vary even when there is no net charge flow over a certain period of time and a certain number of pulses.

In the cases when there is no net charge flow, there does not necessarily need to be zero net charge transfer between consecutive pulses, providing the average net charge transfer over a number of pulses (such as 3 or more) is zero.

The (first) porous layer may be formed from two porous membrane sheets. One of the porous membrane sheets may have a part of its pores, e.g. 30-70% or about 50% of the pores, filled with a cation exchange (CE) material and the other of the two porous membrane sheets may have part of its pores, e.g. 30-70% or about 50% of the pores, filled with an anion exchange (AE) material. The two porous membrane sheets may be put together, such as by laminating. The overlapping cation exchange material and anion exchange material filled pores of the two layers form the second region (ionic diode) of the (first) porous layer and the overlapping, unfilled pores form the first region (normal electroosmotic pumping region) of the (first) porous layer.

The pores may be filled with the AE or CE material by any available technique such as printing or photoinitiated grafting techniques.

The (first) porous layer or the porous membrane sheets may be track etched membranes. This type of membrane offers the advantage that the substrate itself provides electrical insulation between each pore, and thus between the first and second regions of the (first) porous layer.

Alternatively, the (first) porous layer may be formed from a single porous membrane sheet in which the AE and CE functionalization is applied to the same pores of the single porous membrane sheet. This has the advantage that there can be a higher degree of pores with both functionalization, which forms the second regions.

The (first) porous layer may be formed by having a porous sheet with a number of cylindrical pores which form the first region and a number of substantially conical pores which form the second region. The conical pores may have bipolar junctions due to pore wall surface functionalization. Such porous sheets may be formed from track etched membranes.

Many different techniques may be used to obtain CE and AE functionality in the second regions as well as an adequate surface charge in the pores of the first regions so as to make them suitable for EO pumping. These techniques include various physical and chemical vapour deposition techniques, chemical treatments such as photo initiated grafting or other grafting, printing and/or coating or filling with polymers.

Alternatively, standard ion exchange (IE) beads may be used to create CE-AE junctions to form the second regions of the (first) porous layer. For example, ion exchange beads may be embedded in a porous sheet which has been created by phase inversion. Two such sheets may be applied together so as to form a number of bipolar junctions, where the AE and CE beads overlap, which act as the second region(s), while the porous membrane matrix would serve to obtain EO pumping and thus act as the first region(s) of the (first) porous layer.

Alternatively, the (first) porous layer may be made using IE beads in which two porous membrane sheets or discs with cavities each holding at least one IE bead are placed together after having been filled with beads. The overlapping beads may form the second region(s) whilst the areas without beads may form the first region(s). With this arrangement, the locations of the beads in each layer may be exactly matched. The beads may, for example, be polystyrene beads cross linked with divinyl benzene and functionalized with sulfonic acid groups (CE) or amine groups (AE).

Alternatively the (first) porous layer may be formed using a cation exchange membrane and an anion exchange membrane which are each perforated with a regular pattern of holes, using for example a laser or a stamping tool, and a porous membrane sheet allowing for EO transport which is perforated with a different regular pattern. The perforations of the porous membrane sheet may be arranged so that when placed on top of one of the said IE membranes the holes of the membrane and the sheet will not overlap. The EO membrane sheet may then be sandwiched between the CE and AE membranes, with the holes of the CA and AE membranes aligned. The three layers may be put together such as by being laminated together or held together by a mechanical pressure. As a result, CA junctions, i.e. the second region(s) are created by the CE and AE membranes connecting to each other through the holes in the EO membrane sheet, whilst the EO membrane sheet is exposed through the holes in the CA and AE membranes so as to provide the first region(s) of the (first) porous layer.

In a third aspect, the present invention provides an electroosmotic pump for pumping a fluid, the pump comprising a passageway forming a flow path for fluid transport, a porous membrane located within said passageway, the porous membrane comprising: a (first) porous layer having first and second opposite surfaces and a net fluid flow direction parallel to the flow path extending in the porous layer between said opposite surfaces, the porous layer comprising a first region extending in the net fluid flow direction, and a second region laterally offset from the first region with respect to the net flow direction and extending in the net fluid flow direction, wherein when a given amount of charge flows through the porous membrane in a first direction, the ratio of the amount of charge flowing through the first region compared to the second region is greater than when the same amount of charge flows through the porous membrane in a second, opposite direction.

The present invention also provides an electroosmotic pump comprising the porous membrane of the first aspect.

In a fourth aspect, the present invention provides a textile, the textile comprising a porous membrane, the porous membrane comprising: a (first) porous layer having first and second opposite surfaces and a net fluid flow direction extending in the porous layer between said opposite surfaces, the porous layer comprising a first region extending in the net fluid flow direction, and a second region laterally offset from the first region with respect to the net flow direction and extending in the net fluid flow direction, wherein when a given amount of charge flows through the porous membrane in a first direction, the ratio of the amount of charge flowing through the first region compared to the second region is greater than when the same amount of charge flows through the porous membrane in a second, opposite direction.

The present invention may also provide a textile comprising the porous membrane of the first aspect.

As discussed above, the ratio of the amount of charge flowing through the first region compared to the second region when a given amount of charge flows through the porous membrane in a first direction, may be greater than when the same amount of charge flows through the porous membrane in the opposite direction due to the presence of a second porous layer in the porous membrane and/or due to the second region having a resistance which depends on the polarity of the voltage bias which is applied to cause the current to flow.

Alternatively, in the case of the pump or the textile, the ratio of the amount of charge flowing through the first region compared to the second region when a given amount of charge flows through the porous membrane in a first direction, may be greater than when the same amount of charge flows through the porous membrane in the opposite direction due to one of the electrodes of the pump or the textile being further from one of the surfaces of the (first) porous layer compared to the distance between the other electrode and the other surface of the (first) porous layer.

The distance may be greater due the presence of the second porous layer. Alternatively the electrodes may simply be located in positions, such as being held by a rigid frame, which are different distances to the surfaces of the (first porous layer).

The textile may also comprise a fabric layer and/or may be a textile product. The textile product may for example be clothing, seating (e.g. for a vehicle such as an automobile, aircraft or train), or a mattress. In preferred embodiments, a textile product comprises an electroosmotic liquid transport membrane as discussed herein, and a fabric layer. The fabric layer may provide strength to the textile product. Thus the membrane may be integrated as part of a textile product. In certain embodiments, the membrane may be provided between fabric layers.

The fabric layer or layers is (are) preferably made of woven material. An example of a textile product is a waterproof jacket, which may incorporate an electroosmotic liquid transport membrane as described herein for the removal of perspiration away from the body.

Additionally, the present invention may provide a method (as set out above in relation to the second aspect) which comprises providing the pump of the third aspect of the invention or the textile of the fourth aspect of the invention.

The pump or textile may comprise one or more (i.e. any combination) of the optional features discussed above in relation to the first and second aspects of the present invention. Further, the same advantages may be achieved as discussed above in relation to the first and second aspects of the present invention.

The pump or textile may comprise a first electrode and a second electrode, wherein the first electrode is provided on one side of the porous membrane and the other electrode is provided on the opposite side of the porous membrane. The electrodes may be arranged so that a voltage can be provided across the porous membrane. The electrodes may be porous so that fluid transported through the porous membrane can pass through the electrodes. The pore size of the electrodes may be greater than the pore size of the first region so that they do not provide a significant resistance to the flow of fluid through the porous membrane.

The electrodes may be located in the passageway of the pump and may extend across the flow path, in which case the electrodes should be porous so that the fluid pumped by the pump can pass through the electrodes.

The electrodes may be reversible or polarizable electrodes.

The electrodes may be coated onto the porous membrane, such as by chemical or physical vapor deposition techniques. Alternatively, the electrodes may be made of separate layers, like a textile, carbon cloth or non-woven material coated with metal or a redox couple. The electrodes may be held or located at certain distances from the porous membrane.

The electrodes may be redox electrodes or capacitive electrodes.

The electrodes may be in direct contact with, or in close proximity to, i.e. within 10 nm or within 100 nm, of the first and second opposite surfaces of the porous membrane.

Alternatively, one or both of the electrodes may be separated from a surface of the porous membrane by a distance which is similar/equal to, or greater than, the width of the first region (i.e. the dimension of the first region which is perpendicular to the net fluid flow direction or which is parallel to the plane of one of the surfaces of the porous membrane).

The electrodes may be located so that the distance between one of the electrodes and one of the surfaces of the (first) porous layer is less than the distance between the other of the electrodes and the other one of the surfaces of the (first) porous layer.

The different distances between the electrodes and the surfaces of the (first) porous layer may enhance the asymmetry of the electroosmotic flow between when positive and negative voltages are applied across the porous membrane. This is because the distances may provide an area for the electric field to deviate towards the more conductive regions. This means that a greater percentage of the charge can flow through the more conductive region, which may be the second region, when a bias is applied so that the ions flow from the side on which there is the largest gap between the electrode and a surface of the (first) porous layer compared to when the opposite voltage bias is applied.

The pump or textile may also comprise an electronic diode layer which is a porous layer comprising one or more electronic diodes. The electronic diode layer may be located between a first surface of the (first) porous layer and one of the electrodes.

The electronic diode layer may be located on the upstream side of the (first) porous layer and/or an electronic diode layer may be provided on the downstream side of the (first) porous layer.

When there is a plurality of electronic diodes in the electronic diode layer, the electronic diodes of the electronic diode layer should be electrically isolated from each other.

The electronic diodes may be provided, such as by printing, on a porous substrate to form the electronic diode layer. The electronic diodes may each extend through the porous substrate from one surface to the other opposite surface, such as through a pore in the porous substrate.

The electronic diode(s) may each be electrically connected to the electrode which is on the same side of the (first) porous layer as the electronic diode layer. The electronic diode(s) may each be coated on their side nearest the porous membrane (i.e. the side furthest from the electrode) with an electrode material which may be the same material as the material the electrode is made from.

The electronic diodes may be oriented so as to be open (i.e. electrically conductive) when the first voltage bias is applied across the porous membrane (i.e. the bias in which the second region has a higher resistance and/or the bias in which the charge flows from the first porous layer into the second porous layer) and closed (i.e. less electrically conductive) when the second, opposite voltage bias is applied across the porous membrane.

The electronic diode layer may have the effect of effectively bringing the electrode closer to the porous membrane when a voltage bias is applied so that the electronic diodes are open. This is because, in this state, the current will flow through the relatively conductive electronic diodes. As a result of the electrode effectively being closer to the porous membrane, the electric field has less space over which to direct to either the first or the second region of the porous layer (depending on which one is relatively more conductive). Therefore, in the case in which the first region is less conductive than the second region in its reverse bias, the electronic diodes can direct more charge to flow through the first region in a given amount of time than when the electronic diode layer is not provided. Thus, the electronic diode layer can increase the asymmetry of the electroosmotic transport so that the amount of net electroosmotic flow for a given amount of charge can be increased.

When the porous layer comprises a plurality of first regions, or plurality of second regions (such as when the porous membrane is formed by an interconnected structure of the first region punctuated by second regions) the electronic diodes in the electronic diode layer may be positioned so that a greater percentage of the area of electronic diodes is located over the first regions. The electronic diodes may be positioned so that they are only located over the first regions.

The average dimension in a direction along the diode layer, i.e. perpendicular to the net fluid flow direction, of the electronic diodes in the diode layer may be less than the average width of the first region(s). In other words, the resolution of the array of electronic diodes may be less than the resolution of the array of first regions of the (first) porous layer.

The maximum width (which in the case of circular diodes is the diameter) of each electronic diode in the electronic diode layer may be less than the minimum width of each of the first regions of the porous membrane.

The thickness of the electronic diode layer may be approximately equal (i.e. within 10%) to the average width of the first region(s).

The pump or textile may comprise a power source. The power source may be arranged to apply a voltage across the porous membrane. The power supply may provide AC or DC voltage. When the power supply provides DC voltage, the pump or textile may be arranged to reverse the polarity of the DC voltage periodically, for example, on the order of seconds, minutes, or hours.

The magnitude of the voltage in opposite pulses may be different. However, in this case, the length of time of the pulses may be controlled so that over a given period of time (which may be over a number of pulses) there is zero, or only a small, net charge transfer. In other words, the current between opposite pulses may vary providing that, in use, there is no, or only a small, net charge flow over a certain period of time and a certain number of pulses.

In the case of zero net charge flow, there does not necessarily need to be zero net charge transfer between consecutive pulses, providing the average net charge transfer over a number of pulses (such as 3 or more) is zero.

In the case of zero net charge flow, the given amount of time over which there is no net flow of current may be of the order of seconds, minutes or hours depending on the electrical signal applied.

The electrical signal which causes the charge flow across the membrane may be an AC voltage or a pulsed DC voltage.

The pump may be a micropump.

The porous membrane for electroosmotic transport may be used in a number of different applications. For example, the porous membrane may be used in a textile which may for example be used as clothing. The pump may be used in drug delivery to or through skin. The pump may be used in wound care or decubitus care.

In a fifth aspect the present invention provides an electroosmotic textile for pumping a fluid by electroosmotic transport, the textile comprising: a porous membrane, the porous membrane comprising a first porous layer and a second porous layer which are laminated together; a first porous (electrically) conductive layer, wherein the first porous conductive layer is laminated to the first porous layer of the porous membrane; and a second porous (electrically) conductive layer, wherein the second porous conductive layer is laminated to the second porous layer of the porous membrane.

The porous membrane may be such that when a given amount of charge flows through the porous membrane from the first porous conductive layer to the second porous conductive layer more electroosmotic transport of the fluid will occur than when the same amount of charge flows through the porous membrane from the second porous conductive layer to the first porous conductive layer.

This means that it may be possible to achieve a directed fluid flow even when the same amount of charge (on average) is passed in both directions between the porous conductive layers.

In a sixth aspect the present invention provides a method of pumping a fluid through an electroosmotic textile, the method comprising: providing an electroosmotic textile comprising: a porous membrane, the porous membrane comprising a first porous layer and a second porous layer which are laminated together, a first porous conductive layer, wherein the first porous conductive layer is laminated to the first porous layer of the porous membrane; and a second porous conductive layer, wherein the second porous conductive layer is laminated to the second porous layer of the porous membrane; causing charge flow across the porous membrane from the first porous conductive layer to the second porous conductive layer by applying a voltage bias between the first and second porous conductive layers, and causing charge flow across the porous membrane from the second porous conductive layer to the first porous conductive layer by applying an opposite voltage bias between the conductive layers, and wherein, when a given amount of charge flows through the porous membrane from the first to the second porous conductive layer, more electroosmotic transport of the fluid will occur than when the same amount of charge flows through the porous membrane from the second to the first porous conductive layer.

The method may be such that, in a given amount of time, there is no, or only a small, net flow of charge across the membrane, The first porous layer and the second porous layer may have different properties (such as structural and chemical properties) so as to cause more electroosmotic fluid to flow in one direction (e.g. in a direction from the first porous conductive layer to the second porous conductive layer) compared to the other (i.e. asymmetric fluid flow), even when the amount of charge transferred through the entire porous membrane is the same.

The first and second porous layers may have different surface chemistries (such as causing different charges) and/or the first and second porous layers may have different pore sizes.

For example, the second porous layer may have a surface charge whilst the first porous layer is uncharged. The second porous layer may have a negative surface charge. Alternatively the first porous layer may carry a smaller surface charge. This smaller charge may be the same polarity (such as negative) of charge as the second porous layer or the opposite polarity (such as positive charge) of the second porous layer. The first porous layer with the lesser charge may have 80% or less, 60% or less, 50% or less of the absolute value of charge (e.g. zeta potential) of the second porous layer.

The second, or both, of the porous layers may have sulfonic acid groups as the pore surface chemistry, i.e. one or both of the layers may be sulfonated. The second porous layer may have more sulfonic acid groups than the first layer (so that the second porous layers has a greater charge than the first porous layer).

The two porous layers may have the same average pore size. Alternatively the first porous layer may have a pore size which is at least 2, 3, 5 or 10 times the pore size of the second porous layer.

The pore size of one, or both, of the porous layers may be from 1 to 60 nm or 10 to 40 nm.

For example, the second porous layer may have an average pore size from 1 to 60 nm, or 10 to 40 nm, whilst the first porous layer may have an average pore size which is at least 2, 3, 5 or 10 times the average pore size of the second porous layer.

By "pore size" or "average pore size" it is meant the pore size measured by the bubble point test.

The pore size, i.e. the width of the pores (which is the diameter in the case of pores with a circular cross section), of the membrane, of one of the porous layers may be determined using the well-known bubble-point test which is described in American Society for Testing and Materials Standard (ASMT) Method F316.

The porous layers may have substantially equal porosity, e.g. a porosity level which is within 10%, 5%, 2% or 1% of each of the layers, or an equal porosity. Alternatively, the first porous layer may have a higher porosity than the second porous layer, e.g. the porosity of the first porous layer may be about double the porosity of the first porous layer. One of the layers may have a porosity which is greater than the porosity of the other layer. For example, the porosity of one of the layers may be at least 10%, 20%, 50% or 100% higher than the porosity of the other layer. The porosity of one or both of the layers may be between 1 to 65% depending on the intended application of the membrane.

One of the porous layers, e.g. the second porous layer, may in itself be an electroosmotic layer (EO) (i.e. a layer which effects electroosmotic transfer of fluid therethrough when a voltage is applied across the layer) whilst the other porous layer, e.g. the first porous layer, may or may not in itself be an electroosmotic layer.

At least one of the porous layers may be an electroosmotic layer.

The direction of high EO transport may be from a non-electroosmotic layer (i.e. the first porous layer) towards the electroosmotic layer (i.e. the second porous layer). The asymmetry in electroosmotic flow across the membrane may be caused by a concentration polarization phenomenon that occurs at and near the junction between the two laminated porous layers.

In the case in which the second porous layer has pores with a negative surface charge (such as those with sulfonic acid groups), positive ions will be mobile and so electroosmotic transport should be parallel with a positive current and thus electroosmotic transport may be higher when a positive current flows from the first conductive layer to the second conductive layer than when a negative current flows. In this case, for the case in which an equal amount of charge is transferred in each direction, more electroosmotic transport which occur when the first conductive layer is positive than when it is negative.

The membrane (such as when the first porous layer is itself a non-EO membrane and the second porous layer is itself an EO membrane) may cause the current to be rectified in the opposite direction to the EO rectification. Hence, the voltage bias which results in lower electroosmotic transport may result in higher current than the opposite voltage bias. In the case when the current rectification and the electoosmotic rectification occur under opposite biases, it is possible for the bias which causes the greater amount of electroosmotic flow to be applied for longer than the opposite bias whilst inducing zero, or only a small, net charge flow.

One of the layers, e.g. the second porous layer, may have well-ordered (e.g. regular and equal sized) cylindrical pores whilst the other porous layer, e.g. the first porous layer, may also have well-ordered cylindrical pores or alternatively a chaotic pore structure (e.g. a pore structure with pores of varying size (width and length) and/or of varying orientations).

At least one of the porous layers may be a track etched (such as polyethylene terephthalate or polycarbonate) electroosmotic layer. This track etched layer may be sulfonated.

The two porous layers may be of substantially equal thickness, i.e. they may have thicknesses which are within 10% or less preferred within 100% of each other or thicknesses which are exactly the same. For example, the thickness of each of the layers may be 10 to 100 microns.

For example, the second porous layer may be a sulfonated track etched layer with an average pore size of 1 to 60 nm and the first porous layer may have a substantially equal thickness, no charge and/or bigger pore size than the second porous layer.

The two porous layers may be laminated together with a glueless lamination technique. For example, the two porous layers may be laminated together by techniques such as laser welding, ultra sound welding, electron beam welding or by application of heat and/or pressure.

The two porous layers may be laminated together by producing or forming one of the porous layers on the other porous layer. For example, one of the porous layers may be cast or electrospun on one surface of the other porous layer.

By laminated together it may be meant that the two layers are attached to each other.

The porous conductive layers may be referred to as electrodes. The porous conductive layers may be flexible electrodes. This means that the textile can be flexible.

The electrodes may be capacitive carbon electrodes or redox electrodes. For example, the electrodes may be made of activated carbon cloth, silver and silver oxide deposited on carbon cloth or PEDOT-PSS conductive polymer which may be deposited on a conventional fabric.

The electrodes may be low voltage reversible electrodes.

The pore size of the electrodes may be greater than the pore size of the porous membrane so that they do not provide a significant resistance to the flow of fluid through the textile.

The electrodes may be laminated onto the porous layers by being applied as a coating. For example, the electrodes may be coated onto the porous membrane, such as by chemical or physical vapor deposition techniques.

The textile may have a net fluid flow direction extending in the porous membrane between opposite surfaces. The first porous layer may form one surface of the porous membrane and the second porous layer may form the other, opposite surface of the porous membrane. The porous layers may be such as to both extend in a plane which is perpendicular to the net fluid flow direction. The net fluid flow direction will be in a direction which extends from the first porous layer to the second porous layer.

Charge may flow in a direction from the first porous conductive layer to the second porous conductive layer when a first voltage bias is applied across the membrane and may flow in the second, opposite direction (from the second conductive porous layer to the first porous conductive layer) when a second, opposite voltage bias is applied.

The voltage applied to the textile may be controlled so that the sum of charge passed from the first to the second conductive porous layer equals, or is similar to, the amount of charge passed from the second to the first conductive porous layer over a given period of time (such as 1 second, 1 minute or 1 hour). In other words, there may be a zero, or only a small, net flow of charge over time. The small net flow of charge may result from current flow difference of 10% or less, 5% or less, or 1% or less of the current during each positive or negative pulse. For example, there may be a current of 1 $A/m^2$ during application of a voltage pulse and the difference in current between the positive and negative pulses may be 0.1 A. This means that it is possible to use reversible electrodes for directed EO pumping, eliminating or reducing undesired electrolysis and gas bubble formation.

The magnitude of the voltage may be equal in the forward and reverse bias pulses, however, this is not necessarily the case and can vary providing the net flow of charge is zero or only small over a certain time period.

By zero or no net charge flow it is meant that the same amount of charge is passed through the porous membrane (e.g. between the porous conductive layers which are on opposite sides/surfaces of the porous membrane) in both directions when averaged over several pulses or reversals of the voltage bias, i.e. the electric field. Because the same, or similar, amount of charge is passed between the porous conductive layers, i.e. the electrodes, over time, the challenges of bubble formation and liquid electrolysis can be solved or minimized whilst still using an EO pump with significant flow and pressure. For example, there may be a flow of 2 to 20 litre/m²/hour and a pressure which can sustain 5 to 50 cm water column.

The magnitude, duration and current of the opposite pulses applied across the porous membrane may be different. However, the signal may be controlled such that the net flow of charge over a given amount of time is zero, or at least small.

A system comprising the electroosmotic textile may be operated in a potentiostatic or "charge counting" mode, with the voltage (magnitude or bias) or length of pulses being automatically adjusted to cause equal, or similar, charge transfer in both directions.

In the present invention a net electroosmotic transport of fluid may be achieved in the net fluid flow direction even when the same, or similar, amount of charge passes back and forth though the porous membrane, i.e. when there is no net flow of charge.

The electric signal applied across the membrane to effect fluid flow may be AC or pulsed DC. It may be in the form of current pulses, for example symmetric square pulses.

The textile may be arranged so that it can be operated using low frequency AC voltage. The voltage may be below the electrolysis voltage of the liquid to be pumped (which for example is 1.2V for water).

Because the porous membrane is arranged so as to have asymmetric electroosmotic transport properties, even when operated using an AC voltage, directional fluid transport can be achieved.

The electrical signal applied across the porous membrane may cause no net charge flow over time in order to operate the electrodes reversibly. The period of time over which no net charge is passed may be of the order of milliseconds, seconds, minutes, hours or even days or more depending on the electrical signal applied across the membrane.

The magnitude of the voltage in opposite pulses may be different. However, it may be that in this case, the length of time of the pulses may be controlled so that over a given period of time (which may be over a number of pulses) there is zero, or only a small, net charge transfer.

The duration of opposite pulses may also be different and/or vary.

In certain embodiments, different pulse lengths may be required when the opposite voltage biases are equal in magnitude. Similarly, in certain cases the opposite voltages may not be equal in magnitude but applied for the same, or different and/or varying lengths of time.

In the case of zero net current flow, the current between opposite pulses may vary providing there is no net charge flow over a certain period of time and a certain number of pulses.

In the case of zero net current flow, there does not necessarily need to be zero net charge transfer between consecutive pulses, providing the average net charge transfer over a number of pulses (such as 3 or more) is zero.

The textile may comprise a power source. The power source may be arranged to apply a voltage across the porous membrane. The power supply may provide AC or DC voltage. When the power supply provides DC voltage, the textile may be arranged to reverse the polarity of the DC voltage periodically, for example, on the order of seconds, minutes, or hours.

The magnitude of the voltage in opposite pulses may be different. However, in this case, the length of time of the pulses may be controlled so that over a given period of time (which may be over a number of pulses) there is zero, or only a small, net charge transfer. In other words, the current between opposite pulses may vary providing that, in use, there is no, or only a small, net charge flow over a certain period of time and a certain number of pulses.

The electroosmotic textile may also comprise a fabric layer and/or may be a textile product. The textile product may for example be clothing, seating (e.g. for a vehicle such as an automobile, aircraft or train), or a mattress. In preferred embodiments, a textile product comprises an electroosmotic textile as discussed herein, and a fabric layer. The fabric layer may provide strength to the textile product. Thus the electroosmotic textile may be integrated as part of a textile product. In certain embodiments, the electroosmotic textile may be provided between fabric layers.

The fabric layer(s) is (are) preferably made of woven material. An example of a textile product is a waterproof jacket, which may incorporate an electroosmotic liquid transport membrane as described herein for the removal of perspiration away from the body.

Certain features, including preferred or optional features, of any of the above described aspects may be combined with features, including preferred or optional features, of any of the other aspects. For example, features of one or more the first to sixth aspects may be combined with the features of the broadest aspect of the invention. Features of the first, second, third and/or fourth aspects may be applied to the fifth and/or sixth aspects and vice versa.

BRIEF DESCRIPTION OD THE DRAWINGS

Figure 5:
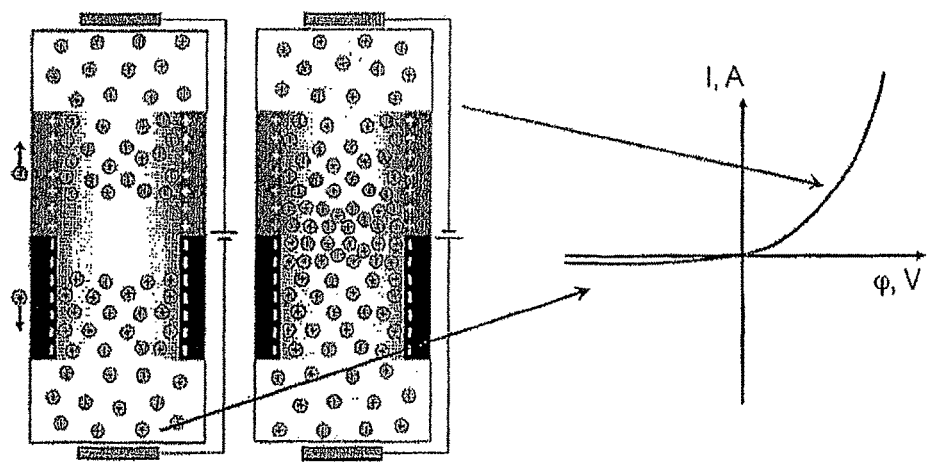
Figure 6:
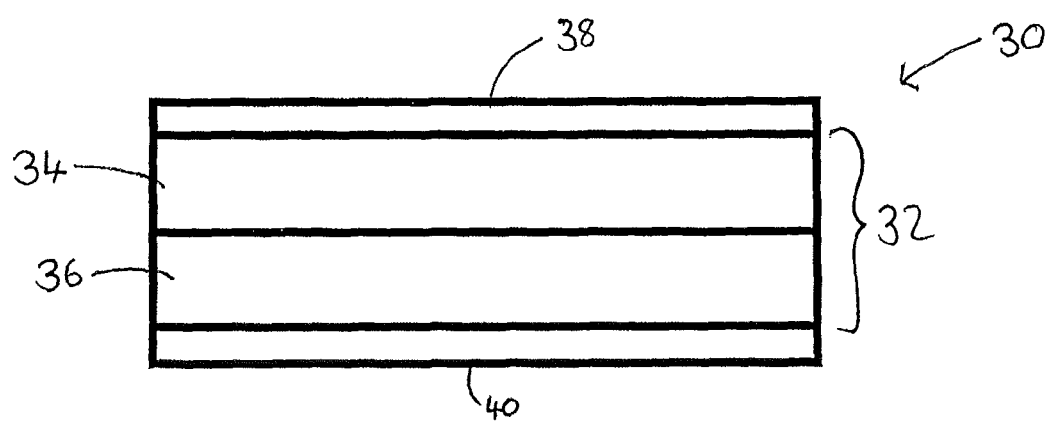

Certain preferred embodiments of the present invention will now be described by way of example only with reference to the accompanying drawings, in which:

FIGS. 1 to 4 show schematic porous membranes for pumping a fluid by electroosmotic transport which are located between two electrodes, FIG. 5 shows a schematic of a bipolar ion exchange membrane under forward and reverse bias conditions; and FIG. 6 is a schematic of an electroosmotic textile.

DETAILED DESCRIPTION

FIG. 1 shows an electroosmotic porous membrane 1 for pumping a fluid by electroosmotic transport for use in an electroosmotic pump or for use in a textile. The porous membrane 1 comprises a plurality of first regions 2 which are for moving a fluid, e.g. water, through the membrane by means of electroosmosis. The first regions 2 each comprise a standard electroosmotic membrane which is designed to effect electroosmotic transport of a fluid when a voltage is applied across the porous membrane 1 and thus may be termed electroosmotic membrane regions 2.

The porous membrane 1 also comprises a plurality of second regions 4 which may be termed ionic diode membranes or ionic diode regions 4. By ionic diode region it is meant that this region 4 has a higher resistance to the flow of ionic charge when a first voltage bias is applied across the porous membrane 1 than when a second opposite voltage bias, which is equal in magnitude to the first voltage bias, is applied across the porous membrane 1.

The porous membrane 1 is located between two electrodes 6, 8. The electrodes 6, 8 permit a voltage to be applied across the porous membrane 1. The voltage may be supplied for example by an external power source (which is not shown in the schematic figures).

The width L2 of the first regions 2 may be substantially the same as the width L1 of the second regions 4. This means that the cross sectional area of porous membrane 1 which is covered by the first regions 2 may be substantially the same as the cross sectional area of porous membrane which is covered by the second regions 4.

In the example shown the ionic diode regions 4 are made from a bipolar ion exchange membrane which are made from a bilayer of cation exchange membrane 10 and anion exchange membrane 12. The height h1 of the cation exchange membrane 10 may be substantially the same as the height h2 of the anion exchange membrane 12. Thus, the cation exchange membrane 10 may extend about halfway through the thickness of the porous membrane 1 from a first surface of the porous membrane 1 and the anion exchange membrane 12 may extend about halfway through the thickness of the porous membrane 1 from an opposite, second surface of the porous membrane 1.

As shown schematically in FIG. 5 when a reverse bias is applied across a bipolar ion exchange membrane concentration polarisation results in an ion depletion (as shown on the left hand side of the figure—the "closed" direction of current) and when a forward bias is applied concentration polarisation results in ion concentration (as shown on the right hand side of the figure—the "opened" direction of current). As a result of the ion concentration, the resistance to the flow of ionic current is much lower when a forward bias is applied compared to when a reverse bias is applied across the ionic diode membrane 4. In other words, the conductivity of the ionic diode layer 4 is much higher when a forward bias is applied compared to when a reverse bias is applied.

Alternatively, or additionally, to the ionic diode regions 4 being bipolar ion exchange membranes, the pores of the ionic diode regions may have an asymmetrical geometry such as substantially conical. The pores are termed substantially conical because they would be truncated cones. Substantially conical pores have the same effect of having a higher resistance to ionic flow in one direction compared to the other.

The conductivity of the electroosmotic membrane region 2 may be approximately the same with both a first voltage bias and an opposite voltage bias of equal magnitude.

In an embodiment, the first and second regions can be separated by an insulating region, also creating a distance between the elements of the first and second regions.

As a result of the resistance of the ionic diode membrane 4 being lower with a forward bias compared to a reverse bias, when a forward bias is applied a greater amount of the charge will flow through the ionic diode membrane 4 than when a reverse bias of equal magnitude is applied. As a result of the electroosmotic regions 2 effecting more electroosmotic transport for a given amount of charge than the ionic diode regions 4, if the amount of charge which flows through the ionic diode regions 4 compared to the electroosmotic regions 2 changes depending on the voltage bias, a net flow of fluid will occur in the direction in which a greater amount of the charge flows through the electroosmotic regions 2 compared to the opposite bias of equal magnitude.

When the current is taken to have a constant absolute value and an equal absolute value for each forward bias and reverse bias voltage pulse, each pulse having the same duration, the current through the electroosmotic membrane regions 2 in the forward bias direction of the ionic diode membranes 4 is given by:

$$I_{MC} = \frac{I}{1 + \frac{R_M}{R_{DO}}}$$

where $I_{MC}$ is the current across the electroosmotic regions 2 with a forward voltage bias (in relation to the ionic diode membranes 4), I is the total current across the porous membrane 1, $R_M$ is the resistance of the electroosmotic regions 2, and $R_{DO}$ is the resistance of the ionic diode membranes 4 with a forward voltage bias.

Under the same conditions, the current through the electroosmotic regions 2 with a reverse bias (in relation to the ionic diode regions 4) is given by:

$$I_{MO} = \frac{I}{1 + \frac{R_M}{R_{DC}}}$$

where $I_{MO}$ is the current across the electroosmotic regions 2 with a reverse voltage bias (in relation to the ionic diode membranes 4), and $R_{DC}$ is the resistance of the ionic diode membranes 4 with a reverse voltage bias.

As mentioned above, the current is taken to have a constant absolute value and an equal absolute value for each following pulse, each pulse having same duration. In the general case, the current could be changed with charge transferred Q, and the averaged amount of charge passed in each direction is equal (i.e. the current and time may be different but the overall charge transferred is the same). When the resistance of the electroosmotic regions 2 (i.e. the first regions) to charge flow is the same irrespective of the voltage bias, there will be a net fluid flow through the membrane and in the direction of the reverse bias for the ionic diode membranes 4, as long as $R_{DC}$ is greater than $R_{DO}$.

The amplitude and duration of the electric signals in the negative and positive biases may be different as shown in the table below whilst still resulting in no net current flow over time.

|  | R2 | | | | | R1 | | | | | |
| --- | --- | --- | --- | --- | --- | --- | --- | --- | --- | --- | --- |
|  | U mV | R Ohm | t sec | I mA | Q mC | U mV | R Ohm | t sec | I mA | Q mC | Q total mC |
| pos bias R2 | 800 | 10 | 60 | 80 | 4800 | 800 | 100 | 60 | 8 | 480 | 5280 |
| neg bias R1 | 700 | 200 | 503 | 3.5 | 1760 | 700 | 100 | 503 | 7 | 3520 | 5280 |
| net charge transferred per region |  |  |  |  | −3040 |  |  |  |  | 3040 | 0 |

Where U is the voltage applied across the porous membrane, R is the resistance of the first or second region, t is the duration over which the electrical signal is applied, I is the current which flows through each of the regions and Q is the charge. This shows that although the duration and magnitude of the opposite voltages may be different the total charge transfer following the application of both of the voltages may be zero.

The ionic diode membrane 4 may be not suited for effecting electroosmotic transport when a voltage is applied across it, for example, the pores in the ionic diode membrane may be too small to transport fluid there through. For example, the pore size may be less than 20 nm, or less than 5 nm, although the desirable pore size will depend on the fluid being transported.

When the porous membrane 1 is located between electrodes 6, 8, the electrodes may be in close proximity (e.g. within 100 nm) to the opposite surfaces of the porous membrane 1.

Alternatively, as shown in FIG. 2a, the electrodes 6, 8 may be in direct contact with the porous membrane 1. The electrodes 6, 8 may for example, be coated onto the porous membrane 1, such as by chemical vapor deposition techniques. Alternatively, the electrodes 6, 8 may be made of separate layers, like a textile, carbon cloth or non-woven material coated with metal or a redox couple.

Alternatively, as shown in FIG. 2b, the electrodes 6, 8 may be spaced from the porous membrane 1 by a distance which is approximately equal to the width of each of the electroosmotic regions 2. The gap on each side of the porous membrane 1 may be filled with a spacer 14. The spacer 14 may have a low resistance to fluid flow, e.g. large average pore size such as greater than 1 micron or more preferably greater than 10 microns, and thus not significantly interfere with the flow of fluid through the porous membrane 1.

As shown in FIG. 2b compared to FIG. 2a the space allows the electric field more distance over which to deviate towards the ionic diode membranes 4 and thus reduces the amount that partly flows through the electroosmotic membrane regions 2 in the case when a forward bias is applied across the membrane. As a result, the asymmetry of the flow properties of the membrane 1 with respect to voltage bias may be increased.

FIGS. 3a and 3b show schematic example porous membranes 1 in which an insulator 16 is located between the electroosmotic membrane region 2 and the ionic diode region 4. This can reduce the amount of, or prevent, current flowing between the electroosmotic membrane region 2 and the ionic diode region 4. The insulator also creates a distance between the first and second elements.

FIG. 4 shows a schematic of an alternative embodiment of the porous membrane 1. The porous membrane 1 comprises a first porous layer 18 and a second porous layer 20 on one of the surfaces (e.g. downstream side) of the first porous layer.

As in the other embodiments, the first porous layer 18 comprises first regions 2 and second regions 4. Similarly to the other embodiments, the first regions are a region which is designed to effect electroosmotic transport of a fluid across the region when a current flows through the region.

In this embodiment, the second regions 4 consist of an anion exchange membrane or a cation exchange membrane.

The second porous layer 20 effectively acts as a spacer so that the distance between the first electrode 6 and one of the surfaces of the first porous layer 18 is larger than the distance between the second electrode 8 and the other of the surfaces of the first porous layer 18.

The second regions 4 are more conductive than the first regions 2. Thus, when a certain voltage bias is applied between the electrodes 6, 8 such that ions flow in a direction from the second layer 20 to the first layer 18 the electric field can deviate more toward the conductive second regions 4 than when an opposite voltage bias is applied between the electrodes 6, 8 such that ions flow in a direction from the first layer 18 to the second layer 20. As a result, for a given magnitude of voltage, a greater percentage of charge in a given time will flow through the second region 4 when the certain voltage bias is applied between the electrodes 6, 8 than when the opposite voltage bias is applied. Thus, there will be less osmotic flow when the certain voltage bias is applied (as the first region 2 has better electroosmotic transport properties than the second region 4).

The sign of the ion exchanger of the second region may be equal to that of the pore walls in the first region, e.g. a cation exchanger may be used in case of a negative surface charge of the first region.

FIG. 6 shows an electroosmotic textile 30. The textile 30 is for pumping a fluid by electroosmotic transport. The textile 30 comprises a porous membrane 32. The porous membrane 32 comprises a first porous layer 34 and a second porous layer 36 which are laminated together. A first porous conductive layer 38 is laminated to the first porous layer 34 of the porous membrane 32 and a second porous conductive layer 40 is laminated to the second porous layer 36 of the porous membrane 32.

The porous membrane 32 is arranged so that when a given amount of charge flows through the porous membrane 32 from the first porous conductive layer 38 to the second porous conductive layer 40 more electroosmotic transport of the fluid will occur than when the same amount of charge flows through the porous membrane 32 from the second porous conductive layer 40 to the first porous conductive layer 38 or vice versa.

The second porous layer 36 may be a sulfonated track etched electroosmotic layer and the first porous layer 34 may be an uncharged membrane.

The invention claimed is:

1. An electroosmotic textile for pumping a fluid by electroosmotic transport, the textile comprising:
    a porous membrane, the porous membrane comprising a first porous layer and a second porous layer which are laminated together;
    a first porous conductive layer, wherein the first porous conductive layer is laminated to the first porous layer of the porous membrane; and
    a second porous conductive layer, wherein the second porous conductive layer is laminated to the second porous layer of the porous membrane;
    wherein when a given amount of charge flows through the porous membrane from the first to the second porous conductive layer more electroosmotic transport of the fluid will occur than when the same amount of charge flows through the porous membrane from the second to the first porous conductive layer.

2. An electroosmotic textile according to claim 1, wherein the first and second porous layers have different surface charges.

3. An electroosmotic textile according to claim 2, wherein the second porous layer has a surface charge and the first porous layer is uncharged.

4. An electroosmotic textile according to claim 2, wherein the first porous layer has a surface charge which has an absolute value which is 80% or less of the absolute value of charge of the second porous layer.

5. An electroosmotic textile according to claim 1, wherein the second porous layer comprises sulfonic acid groups.

6. An electroosmotic textile according to claim 1, wherein the first and second porous layers have different average pore sizes.

7. An electroosmotic textile according to claim 1, wherein the first porous layer has a pore size which is at least 4 times the pore size of the second porous layer.

8. An electroosmotic textile according to claim 1, wherein the average pore size of the second porous layer is from 1 to 60 nm.

9. An electroosmotic textile according to claim 1, wherein the first porous layer has a porosity which is greater than the porosity of the second porous layer.

10. An electroosmotic textile according to claim 1, wherein the second porous layer is an electroosmotic layer.

11. An electroosmotic textile according to claim 10, wherein the first porous layer is not an electroosmotic layer.

12. An electroosmotic textile according to claim 10, wherein the electroosmotic layer is a sulfonated track etched polyethylene terephthalate layer.

13. An electroosmotic textile according to claim 1, wherein the first and second porous layers are of substantially equal thickness.

14. An electroosmotic textile according to claim 1, wherein the first conductive porous layer and the second conductive porous layer are low voltage reversible electrodes.

15. An electroosmotic textile according to claim 1, wherein the textile comprises a power source.

16. An electroosmotic textile according to claim 15, wherein the power source is arranged to apply a low frequency AC voltage across the porous membrane.

17. A method of pumping a fluid through an electroosmotic textile, the method comprising:
providing an electroosmotic textile comprising:
a porous membrane, the porous membrane comprising a first porous layer and a second porous layer which are laminated together;
a first porous conductive layer, wherein the first porous conductive layer is laminated to the first porous layer of the porous membrane; and
a second porous conductive layer, wherein the second porous conductive layer is laminated to the second porous layer of the porous membrane;
causing charge flow across the porous membrane from the first porous conductive layer to the second porous conductive layer by applying a voltage bias between the first and second porous conductive layers, and causing charge flow across the porous membrane from the second porous conductive layer to the first porous conductive layer by applying an opposite voltage bias between the conductive layers, and
wherein, when a given amount of charge flows through the porous membrane from the first to the second porous conductive layer, more electroosmotic transport of the fluid will occur than when the same amount of charge flows through the porous membrane from the second to the first porous conductive layer.

18. The method of claim 17, wherein, in a given amount of time, there is no net flow of charge across the membrane.

* * * * *